(12) United States Patent
Elgammal

(10) Patent No.: US 11,625,906 B2
(45) Date of Patent: Apr. 11, 2023

(54) METHOD FOR IDENTIFYING WORKS OF ART AT THE STROKE LEVEL

(71) Applicant: Artrendex, Inc., New Brunswick, NJ (US)

(72) Inventor: Ahmed Elgammal, East Windsor, NJ (US)

(73) Assignee: Artrendex, Inc., New Brunswick, NJ (US)

( * ) Notice: Subject to any disclaimer, the term of this patent is extended or adjusted under 35 U.S.C. 154(b) by 104 days.

(21) Appl. No.: 17/396,590

(22) Filed: Aug. 6, 2021

(65) Prior Publication Data

US 2021/0383152 A1 Dec. 9, 2021

Related U.S. Application Data

(63) Continuation of application No. 16/396,222, filed on Apr. 26, 2019, now Pat. No. 11,087,164.

(60) Provisional application No. 62/663,359, filed on Apr. 27, 2018.

(51) Int. Cl.
*G06V 10/44* (2022.01)
*G06N 20/00* (2019.01)
*G06V 10/26* (2022.01)
*G06V 10/75* (2022.01)
*G06V 30/32* (2022.01)

(52) U.S. Cl.
CPC ............. *G06V 10/44* (2022.01); *G06N 20/00* (2019.01); *G06V 10/26* (2022.01); *G06V 10/7553* (2022.01); *G06V 30/347* (2022.01)

(58) Field of Classification Search
CPC .... G06V 10/44; G06V 10/26; G06V 10/7553; G06V 30/347; G06N 20/00; G06N 3/0454; G06N 3/084; G06N 20/10; G06N 3/0445
USPC ........................................................ 382/199
See application file for complete search history.

(56) References Cited

U.S. PATENT DOCUMENTS

| 6,017,218 | A | 1/2000 | Bright |
| 8,930,302 | B2 | 1/2015 | Scholzen |
| 2013/0127869 | A1 | 5/2013 | Winnemoeller |
| 2017/0351973 | A1 | 12/2017 | Elgammal |

OTHER PUBLICATIONS

Elgammal, "Picasso, Matisse, or a Fake? Automated Analysis of Drawings at the Stroke Level for Attribution and Authentication" arXiv Nov. 13, 2017. (Year: 2017).*

M. M. van Dantzig. Pictology: An Analytical Method for Attribution and Evaluation of Pictures., E. J. Brill, Leiden, Netherlands, 1973, Chapters 1 and 2.

(Continued)

*Primary Examiner* — Juan A Torres
(74) *Attorney, Agent, or Firm* — Haynes and Boone, LLP

(57) ABSTRACT

The present disclosure relates to methods of analyzing works of art for purposes of authentication or attribution. Such methods may be implemented by receiving digital image data associated with a work of art, identifying a plurality of artist's strokes formed along a surface of the work of art, segmenting the plurality of strokes into a plurality of individual strokes, analyzing the plurality of individual strokes to determine stroke characteristics, and comparing the stroke characteristics to stroke characteristics derived from one or more computational models based on known works of art.

4 Claims, 4 Drawing Sheets

(56) References Cited

OTHER PUBLICATIONS

Jinhong Katherine Guo, David Doermann, and A Rosenfield. Off-line skilled forgery detection using stroke and sub-stroke properties. In Pattern Recognition, 2000. Proceedings. 15th International Conference on, vol. 2, pp. 355-358. IEEE, 2000.

C Richard Johnson, Ella Hendriks, Igor J Berezhnoy, Eugene Brevdo, Shannon M Hughes, Ingrid Daubechies, Jia Li, Eric Postma, and James Z Wang. Image processing for artist identification. IEEE Signal Processing Magazine, 25(4), 2008.

Gungor Polatkan, Sina Jafarpour, Andrei Brasoveanu, Shannon Hughes, and Ingrid Daubechies. Detection of forgery in paintings using supervised learning. In Image Processing (ICIP), 2009 16th IEEE International Conference on, pp. 2921-2924. IEEE, 2009.

Jia Li, Lei Yao, Ella Hendriks, and James Z Wang. Rhythmic brushstrokes distinguish van gogh from his contemporaries: findings via automated brushstroke extraction. IEEE transactions on pattern analysis and machine intelligence, 34(6):1159-1176, 2012.

Ravneet Singh Arora and Ahmed M. Elgammal. Towards automated classification of fine-art painting style: A comparative study. In ICPR, 2012.

Babak Saleh, Kanako Abe, Ravneet Singh Arora, and Ahmed Elgammal. Toward automated discovery of artistic influence. Multimedia Tools and Applications, pp. 1-27, 2014.

Rinku Nemade, Apoorva Nitsure, Poorwa Hirve, Sunil B. Mane, Detection of Forgery in Art Paintings using Machine Learning, IJIRSET, vol. 6. Issue 5, pp. 8681-8692, May 2017.

Louisa Lam, Seong-Whan Lee, and Ching Y Suen. Thinning methodologies—a comprehensive survey. IEEE Transactions on pattern analysis and machine intelligence, 14(9):869-885, 1992.

Wilhelm Burger and Mark J. Burge. Fourier Shape Descriptors, pp. 665-711. Springer London, London, 2016.

S. Hochreiter and J. Schmidhuber. Long short-term memory. Neural Computation, 9(8):1735-1780, 1997.

J. Chung, C. Gulcehre, K. Cho, and Y. Bengio. Empirical evaluation of gated recurrent neural networks on sequence modeling. NIPS'2014 Deep Learning workshop, 2014.

Blessing, "Using Machine Learning for Identification of Art Paintings", Technical report, Publication Year 2010.

Nielsen, "Neural Networks and Deep Learning", Determination Press, Publication Year 2015, pp. 167-168.

Li, "Studying digital imagery of ancient paintings by mixtures of stochastic models", IEEE Transactions on Image Processing, Publication Year 2003.

Lamberti "Computer-assisted analysis of painting brushstrokes: digital image processing for unsupervised extraction of visible X features from van Gogh's works", Publication Year 2014.

\* cited by examiner

METHOD FOR IDENTIFYING WORKS OF ART AT THE STROKE LEVEL

CROSS-REFERENCE TO RELATED PATENT APPLICATIONS

The present application claims the benefit of the earlier filing date of U.S. non-provisional patent application Ser. No. 16/396,222, filed Apr. 26, 2019, entitled "Method For Identifying Works Of Art At The Stroke Level", scheduled to be issued as U.S. Pat. No. 11,087,164 on Aug. 10, 2021, which claims the benefit of the earlier filing date of U.S. provisional patent application No. 62/663,359, filed on Apr. 27, 2018, entitled "Systems And Methods For Authentication And Attribution Of Works Of Art At The Stroke Level", the contents of which are hereby incorporated by reference as if fully contained herein.

BACKGROUND OF THE INVENTION

Field of the Invention

The present disclosure relates to object authentication and, more particularly, to computational analysis of strokes in works of art to determine if a work of art is authentic and attributable to an artist.

Description of the Relevant Art

Industries have developed around authenticating objects such as currency and, better known, works of art such as paintings and sculptures. Art forgery has always been a lucrative business. It is even more lucrative today with a 60 Billion Dollar art market, with an ever growing proportion of art being sold in online market places. Clearly, there is a need for a cost-effective technology to filter out mass volumes of forged art. Organizations requiring such services include art foundations, museums of art, auction houses, and art galleries, among others. Traditionally, stylistic analysis through visual inspection by a human expert has been the main way to judge the authenticity of works of art. Attribution of art works is a very essential task for art experts. For example, individuals may know about a particular period (e.g., currency from the Civil War), a specific artist (e.g., Picasso), and so on. These individuals, based on their knowledge, visually inspect the object being authenticated and, based on their observation, render an opinion as to the likelihood that the object is authentic. In the field of artwork, this method was pioneered by Giovanni Morelli (1816-1891), who was a physician and art collector, and has become known as Morellian analysis. This connoisseurship methodology relies on finding consistent detailed "invariant" stylistic characteristics in the artist's work. For example Morelli paid great attention to how certain body parts, such as ears and hands are depicted in paintings by different artists, not surprisingly given his medical background. This methodology relies mainly on the human eye and expert knowledge. However, such authentication methods require human inspection, which tend to be subjective in nature.

Most forged works of art are based on copying certain compositional and subject matter-related elements and patterns often used by the artist being copied. Reliance upon such elements may mistakenly connect a test subject work to figures and compositions in an artist's known works even though the work of art has been forged.

More invasive authentication methods have been used, typically focusing on the physical properties of the work of art, but at potentially significant cost to the object being studied. For example, paint from a painting may be tested to determine if any materials are present in the painting which would not have been available at the time which the painting is claimed to have been developed. Similarly, samples may be taken of the canvas to determine the origin of the materials forming the canvas. Such technical analysis focuses on analyzing the surface of the painting, the underpainting, and/or the canvas material. There is a wide spectrum of imaging (e.g. infrared spectroscopy and x-ray), chemical analysis (e.g. chromatography), and radiometric (e.g., carbon dating) techniques that have been developed for this purpose. For example, x-ray imaging has been used to determine the type of canvas material used and the thread count of such material. These methods focus upon the composition of the materials and pigments used in making the different layers of the work, and how that relates to materials that were available to, and/or typically used by, the original artist. These techniques are complementary to each other, but each of them has limitations to the scope of their applicability. Further, these methods often require irreversible actions be taken, which can significantly devalue the objects being authenticated.

In addition, sophisticated technical analysis is costly, and therefore impractical for less-expensive works of art. For example, there are large volumes of drawings, prints, and sketches for sale that are relatively inexpensive compared to paintings, and are often sold for a few thousand Dollars, or even a few hundred Dollars. Performing sophisticated technical analysis in a laboratory would be more expensive than the price of the work itself. This prohibitive cost makes it attractive for forgers to extensively target this market.

SUMMARY OF THE INVENTION

Accordingly, it is an object of the present invention to provide a method for unobtrusively attributing and/or authenticating works of art.

It is another object of the present invention to provide such a method for assisting human art experts in performing stylistic analysis of works of art in a quantifiable, objective manner.

It is still another of the present invention to provide such a method which does not rely solely upon compositional and/or subject matter-related elements and patterns of a work of art that are often associated with the works of well-known artists.

Yet another object of the present invention is to provide such a method which is non-destructive, and which will not devalue the work of art under examination.

Still another object of the present invention is to provide such a method which is comparatively inexpensive, and which is economically practical even for works of art of relatively low value.

Briefly described, and in accordance with various embodiments, the present invention provides a computer-implemented method of assessing a work of art that includes a plurality of artist's strokes. A plurality of digital images of works of art, for which the identity of the artist is known, are provided to a computer; each of such known works of art includes a plurality of artist's strokes. A computer is used to identify individual strokes within such known works of art, as well as to determine stroke characteristics for each identified individual stroke. Using the computer, one or more stroke signatures are established from such stroke characteristics associated with the artist of each such known work of art. These stroke signatures are stored in a memory associated with a computer, for example, within a computational model.

A digitized image of a work of art to be analyzed is provided to a computer. The work of art to be analyzed also includes a plurality of strokes. Using a computer, individual strokes within the work of art to be analyzed are identified, and stroke characteristics are determined for each identified individual stroke within the work of art to be analyzed. The computer compares stroke characteristics within the work of art to be analyzed with stored stroke signatures associated with one or more artists of known works of art. Based upon such comparison, the computer determines the likelihood that the work of art to be analyzed is a work of art that was created by an artist of one or more of such known works of art.

In some embodiments of such invention, this method is used to authenticate a work of art as having been created by a particular artist. In other embodiments of the invention, this method is used to attribute a work of art to one of a plurality of potential artists, thereby serving to identify the artist who created such work of art.

In various embodiments of the invention, the stored stroke signatures associated with one or more artists of such known works of art collectively form at least one computational model. In some embodiments of the invention, there may be a separate computational model for each different artist of known works of art.

In at least some embodiments of the invention, the aforementioned computational model may include a machine learning model. Such a machine learning model may include a recurrent neural network. This recurrent neural network may be trained using deep learning techniques.

In various embodiments of the invention, the plurality of strokes of the work of art to be analyzed are not visible to the human eye; for example, a "skeleton" drawing by an artist may be hidden under paint in a finished work of art. In this case, the skeleton drawing, which includes artist's strokes, is obtained by a non-invasive imaging technique to generate the digitized image of the work of art to be analyzed.

In some embodiments of the invention, stroke characteristics of each individual stroke are determined by objectively quantifying shape characteristics for each identified individual stroke. The step of determining shape characteristics includes quantifying at least one characteristic from the group including boundary shape, contour smoothness, contour curvature, stroke thickness profile, and relative stroke length.

In various embodiments of the invention, a computer-implemented method of analyzing a work of art includes receiving digitized image data associated with the work of art to be analyzed. A plurality of strokes within the received digitized image data, associated with the work of art to be analyzed, are identified. The plurality of identified strokes are segmented into a plurality of digitized individual strokes associated with the work of art to be analyzed. The plurality of digitized individual strokes of the work to be analyzed are, in turn, analyzed to determine corresponding stroke characteristics. The determined corresponding stroke characteristics are compared to stroke characteristics derived from at least a first computational model that is based on authentic works of art by a first known artist. The computer-implemented method determines the statistical likelihood that each stroke being analyzed was created by such first known artist, and aggregate that set of determined statistical likelihoods to determine a statistical likelihood that the work of art being analyzed was created by such first known artist. A high statistical likelihood that the work of art being analyzed was created by such first known artist indicates that the work of art being analyzed is likely to be an authentic work of art by such first known artist.

In at least some embodiments of the invention, the determined stroke characteristics of the work to be analyzed are also compared to stroke characteristics derived from at least a second computational model that is based on authentic works of art by a second known artist. The computer-implemented method likewise determines the statistical likelihood that each stroke being analyzed was created by such first known artist, and aggregates those determined likelihoods to determine a statistical likelihood that the work of art being analyzed was created by such second known artist. If the result of such comparisons provides a high statistical likelihood that the work of art being analyzed was created by such first known artist, then the work of art being analyzed is likely attributable to such first known artist. On the other hand, if the result of such comparisons provides a high statistical likelihood that the work of art being analyzed was created by such second known artist, then the work of art being analyzed is likely attributable to such second known artist.

In some embodiments of the invention, the first computational model, based on authentic works of art by a first known artist, includes a machine learning model. This machine learning model may include a recurrent neural network. The computer-implemented method may include training the recurrent neural network using deep learning techniques.

In some of the embodiments of the aforementioned invention, the plurality of strokes of the work of art to be analyzed are not visible to the human eye, and a non-invasive imaging technique is therefore used to generate the digitized image data associated with a work of art to be analyzed.

In various embodiments of the invention, the analysis of the plurality of digitized individual strokes of the work for determining corresponding stroke characteristics includes the determination of shape characteristics for each of the plurality of digitized individual strokes associated with the work of art to be analyzed. Such shape characteristics may include one or more characteristics from the group including boundary shape, contour smoothness, contour curvature, stroke thickness profile, and relative stroke length.

DETAILED DESCRIPTION

Figure 1:
FIG. 1 is an illustration of simple artist strokes, showing that spontaneous strokes differ in their shape and tone at their beginning, middle and end.

The method disclosed herein is a computational approach for analysis of strokes in line drawings by artists. The disclosed methodology facilitates attribution of drawings of unknown authors in a way that is not easy to be deceived by forged art. The methodology used is based on segmenting individual strokes in drawings, and quantifying the characteristics of the individual strokes. Applicant designed and compared different hand-crafted and learned features for the task of quantifying stroke characteristics. Applicant also proposes and compares herein different classification methods at the drawing level. Experimentation was conducted with a dataset of 300 digitized drawings with over 80 thousand strokes. The collection of drawings mainly consisted of drawings of Pablo Picasso, Henry Matisse, and Egon Schiele, along with a small number of representative works of other artists. These experiments show that the methodology of the present invention can classify individual strokes with accuracy in the range of 70%-90%, and aggregate over drawings with accuracy above 80%, while being robust to detect fake drawings, with accuracy approaching 100% for detecting fakes in most instances.

Applicant addresses herein the role that computer vision technology and/or artificial intelligence technology play in this domain compared to the spectrum of the other available technical analysis techniques. The method disclosed herein complements other technical analysis techniques for three reasons. First, computer vision can uniquely provide a quantifiable scientific way to approach the traditional stylistic analysis, even at the visual spectrum level. Second, the present method provides alternative tools for the analysis of works of art that lie out of the scope of applicability for the other techniques. For example, this can be very useful for detecting forgery of modern and contemporary art where the forger would have access to pigments and materials similar to what an original artist had used. Third, computer vision technology provides a cost-effective solution compared to the cost of other technical analysis methods.

It is worthy to mention that several papers have addressed art style classification, where style is an art movement (e.g. Impressionism), or the style of a particular artist (e.g. the style of Van Gogh). Such stylistic analysis does not target authentication. Such works use global features that mainly capture the composition of the painting. In fact, the known method of style classification will classify a painting, done in the style of Van Gogh for example, as a Van Gogh, since it is designed to do so. Stylistic analysis is crucial for attribution, in particular among contemporaneous artists or artists who worked within the same workshop and had access to the same materials.

The methodology used herein is based on quantifying the characteristics of individual strokes in drawings and comparing these characteristics to a large number of strokes by different artists using statistical inference and machine learning techniques. This process is inspired by the methodology of Maurits Michel van Dantzig directed to simple strokes. Spontaneous strokes differ in their shape and tone at their beginning, middle and end. An example of an artist's strokes is shown in FIG. 1. Van Dantzig suggested several characteristics to distinguish the strokes of an artist, and suggested that such characteristics capture the spontaneity of how original art is being created, in contrast to the inhibitory nature of imitated art.

Among the characteristics suggested by van Dantzig to distinguish the strokes of an artist are the shape, tone, and relative length of the beginning, middle and end of each stroke. The characteristics include also the length of the stroke relative to the depiction, direction, pressure, and several others. The list of characteristics suggested by van Danzig is comprehensive and includes, in some cases, over one hundred aspects that are designed for inspection by the human eye. The main objective is to distinguish spontaneous strokes characterizing a certain artist from inhibited strokes that have been copied from original strokes to imitate the style of the original artist. In contrast to subject matter and compositional elements, the characteristics of individual strokes carry the artist's unintentional signature, which is hard to imitate or forge, even if the forger intends to do. To rule out the possibility of a subject work being created by another artist imitating a well-known style, i.e., a pastiche, one must compare features and visual elements that are not easily copied by such an artist.

Applicant's method disclosed herein does not implement the exact list of characteristics suggested by van Dantzig. Instead, Applicant developed methods for quantification of strokes that are inspired by the methodology van Dantzig, trying to capture the same concepts in a way that is suitable to be quantified by the machine, is relevant to the digital domain, and facilitates statistical analysis of a large number of strokes by the machine rather than by human eye. In doing so, the methods disclosed herein avoid using comparisons based on compositional and subject-matter-related patterns and elements.

Applicant discloses herein a method for, among other things, segmenting individual strokes. Such methods include hand-crafted and learned deep neural network features for the task of quantifying stroke characteristics. The methodology used in this study is based on quantification of individual stroke characteristics and results in a reliable framework that allows comparing a subject work to a collection of works by different artists to infer the attribution based on these characteristics. This also facilitates combining evidence from a massive number of analyzed strokes and using statistical inference and machine learning techniques to come up with quantifiable measures of attribution.

The methods disclosed herein include classification methods at the drawing level. Applicant experimented with a dataset of 300 digitized drawings with over 70 thousand strokes. The collection mainly consisted of drawings of Pablo Picasso, Henry Matisse, and Egon Schiele, besides a small number of representative works of other artists. Applicant experimented on different settings of attributions to validate the methodology disclosed herein. In addition, Applicant experimented with forged art works to validate the robustness of the disclosed methodology and its potentials in authentication.

In developing the methods disclosed herein, Applicant faced many challenges. The variability in drawing technique, paper type, size of the artwork, digitization technology, and spatial resolution impose various challenges in developing techniques to quantify the characteristic of strokes that are invariant to these differences.

Drawings are made using different techniques, materials and tools, including, but not limited to drawings using pencil, pen and ink, brush and ink, crayon, charcoal, chalk, and graphite. Different printing techniques also are used such as etching, lithograph, linocuts, wood cuts, dry points, and others. Each of these techniques results in different stroke characteristics. Upon first consideration, this might suggest developing technique-specific models of classifying strokes. However, each artist typically prefers certain techniques over others, which introduces unbalance in the data collection. Applicant has conducted tests comparing technique-specific comparisons to across-technique comparisons, to determine whether one can capture invariant stroke characteristics for each artist that persist across different techniques.

Drawings are executed on different types of papers, which, along with differences in digitization, imply variations in the tone and color of the background. This introduces a bias in the data. It is desired that artists are identified based on their strokes, and not based on the color tone of the paper used. Different types of papers along with the type of ink used result in different diffusion of ink at the boundaries of the strokes which, combined with digitization effects, alter the shape of the boundary of the stroke. In order to overcome variations in the tone and color of the background paper or other artist media, the present method serves to isolate, unify, and suppress background tones, separate from the foreground strokes.

Drawings are made on different-sized papers, and digitized using different resolutions. The size of the original drawing as well as the digitization resolution are necessary to quantify characteristics related to the width or length of strokes. Therefore, the present method quantifies the characteristics of the strokes in a standard way, e.g., converting all measurements to the metric system. The present method applies a technique that is invariant to size and resolution.

Figure 2:
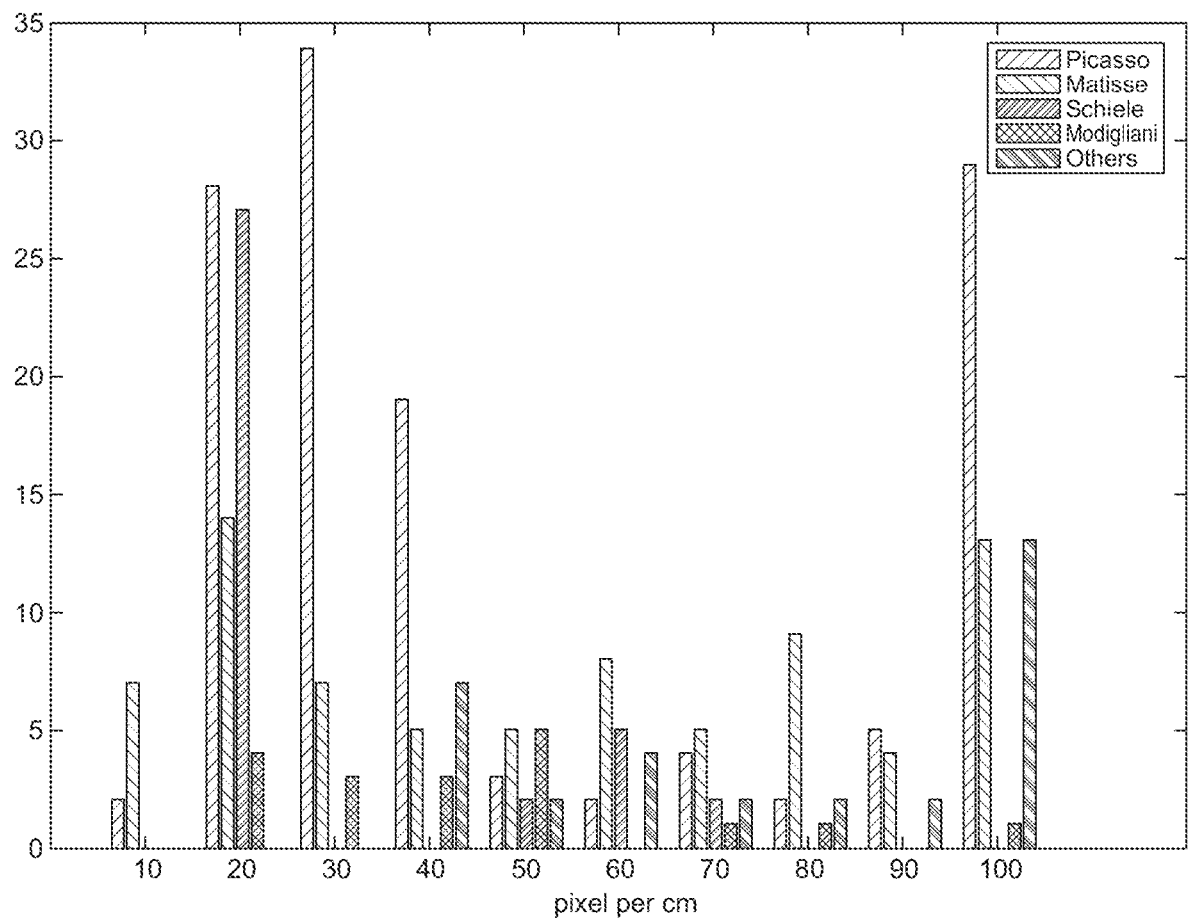
FIG. 2 is a bar chart showing the distribution of digitization resolution, in pixels per cm, for several artists.

A collection of 297 drawings were gathered from different sources to train, optimize, validate, and test the various classification methodologies used in this study. The drawings selected are restricted to line drawings, i.e., it excludes drawings that have heavy shading, hatching and watercolored strokes. The collection included 130 drawings and prints by Picasso, 77 drawings/prints by Henry Matisse, 36 drawings/prints by Egon Schiele, 18 drawings/prints by Amedeo Modigliani, and 36 additional prints/drawings created by other artists, created between 1910 and 1950 AD. These artists were chosen since they were prolific in producing line drawings during the first half of the Twentieth century. The collection included a variety of techniques including: pen and ink, pencil, crayon, and graphite drawings as well as etching and lithograph prints. Table 1 below shows the number of drawings for each artist and technique.

his classical period (1920's-1930's), including 23 plates from the Vollard suite, in particular from the Sculptor Studio collection, mainly produced in 1933. However, the collection also included 107 works from sources other than the Vollard suite because almost all works in the Vollard suite are etchings, which makes the characteristics of the strokes quite different from pen and ink drawing. The Picasso collection included works not only in neoclassical style, but in a variety of styles, to insure that the classification was not based on the difference in style between the neoclassical style of Picasso and the non-neoclassical style of Matisse, Schiele, and others. The collection included digitized works from books, downloaded digitized images from different sources, and screen captured images for cases where downloading was not permitted. The resolution of the collected images varies depending on the sources. The effective resolution varies from 10 pixels per cm to 173 pixels per cm, depending on the actual drawing size and the digitized image resolution. Because of this wide range of resolutions, the method disclosed herein is designed to be invariant to the digitization resolution. FIG. 2 shows the distribution of the digitized images resolution.

Figure 3:
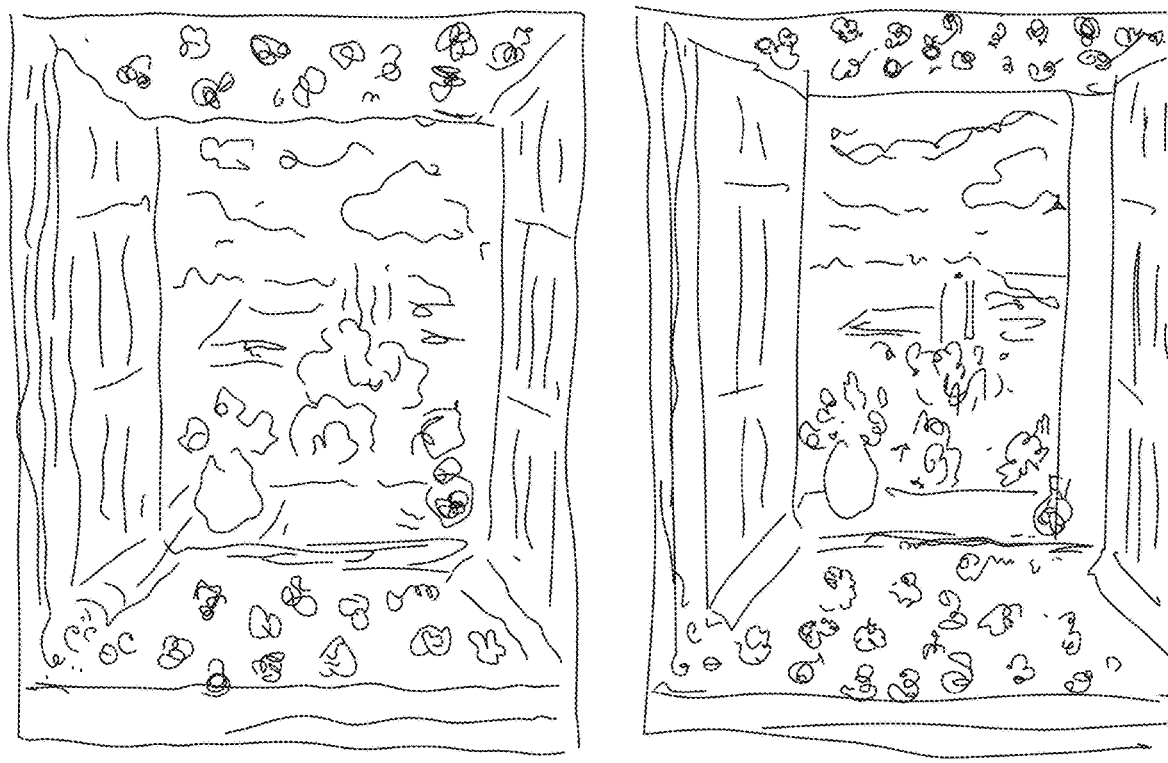
FIG. 3 is an example of two images, one an authentic original, and the other a fake copied from the original.

As part of the development of the methods disclosed herein, and "fake drawing" dataset was also created. To validate the robustness of the methods disclosed herein regarding detection of forged art, five artists were commissioned to make drawings similar to those of Picasso (24 fakes), Matisse (39 fakes) and Schiele (20 fakes) using the same drawing techniques as the original artists, for a total of 83 fake drawings. None of these fake drawings was used in training the computational models used for stroke analysis; they were only used for testing purposes. FIG. 3 shows an example of a fake drawing side-by-side with a similar real drawing.

The method for segmentation of individual strokes will now be described. A typical isolated stroke is a line or curve, with a starting point and an endpoint. A stroke can have zero endpoints (closed curve) or one endpoint, which are special cases that do not need further segmentation. However, strokes typically intersect to form a network of tangled strokes that needs to be untangled. A network of strokes is characterized by having more than two endpoints. Since strokes are thin elongated structures; a skeleton representation can preserve their topological structure even in a

TABLE 1

| Technique | Pen/brush (ink) | Etching | Pencil | Drypoint | Lithograph | Crayon | Charcoal | Unknown | Total |
|---|---|---|---|---|---|---|---|---|---|
| Picasso | 80 | 38 | 8 | 2 | 2 | 0 | 0 | 0 | 130 |
| Matisse | 45 | 10 | 5 | 2 | 14 | 1 | 0 | 0 | 77 |
| Schiele | 0 | 0 | 10 | 0 | 0 | 5 | 4 | 17 | 36 |
| Modigliam | 0 | 0 | 9 | 0 | 0 | 8 | 1 | 0 | 18 |
| Others | 20 | 0 | 0 | 0 | 9 | 4 | 1 | 2 | 36 |
| Total | 145 | 48 | 32 | 4 | 25 | 18 | 6 | 19 | 297 |
| Strokes | 36,533 | 19,645 | 9,300 | 914 | 6,180 | 4,648 | 666 | 2,204 | 80,090 |

Others: Georges Braque, Antoine Bourdelle, Massimo Campigli, Marc Chagall, Marcel Gimond, Alexaj Jawlensky, Henri Laurens, Andre Marchand, Albert Marquet, Andr Masson, Andre Dunoyer Dr Segonzac, Louis Toughague In the domain of drawing analysis it is very hard to obtain a dataset that uniformly samples artists and techniques. The collection used by Applicant is biased towards ink drawings, executed mostly with pen, or using brush in a few cases. There are a total of 145 ink drawings in the collection. The collection contains more works by Picasso than by other artists. In all the validation and test experiments, an equal number of strokes were sampled from each artist to eliminate data bias. The Picasso collection included works from network configuration. Therefore, the segmentation of strokes is performed using such a skeleton representation.

There is a large classical literature in the computer vision field directed to detecting junctions on edge maps as a way to characterize object boundaries, make inferences about three-dimensional structure, and form representations for recognition. Unlike classical literature, which typically focuses on natural images, the detection of junctions and endpoints is fortunately relatively easy, since they persist in a skeleton representation of the network of strokes. The methods disclosed herein make use of the information regarding such junctions and endpoints to segment individual strokes.

Junctions of strokes play a crucial role in identifying the intersections between strokes. There are two basic ways that strokes intersect, namely, an occluder-occluded configuration that forms a T-shaped junction, or two strokes crossing each other to form an X-shaped junction. A T-junction is a continuation point of the occluding stroke and an endpoint for the occluded stroke. In practicing the present method, it is important to preserve the continuation of the occluding stroke at the T-junction.

The stroke segmentation process takes a network of strokes and identifies one occluding stroke at a time, and "removes" it from the network of strokes to form one or more residual networks that are recursively segmented. This is achieved by constructing a fully connected graph whose vertices are the endpoints in the network, and edges are weighted by the cost of reaching between each two endpoints. The cost between two endpoints reflects the bending energy required at the junctions.

Let the endpoints in a network of strokes be denoted by $e_1, \ldots, e_m$, and let the junction locations be denoted by $j_1, \ldots, j_n$. The cost of the path between any two end points $e_j$ to $e_j$ is the cumulative curvature along the skeleton path between them, where the curvature is only counted close to junctions. The rational is that it does not matter how much bending a stroke would take as long as it is not at the junctions. Let $\gamma(t):[0:1] \to R^2$ be the parametric representation of the skeleton curve connecting $e_i$ and $e_j$. The cost is defined as $$o(e_i, e_j) = \int_0^1 K(t) \cdot \varphi(\gamma(t)) dt$$

where $K(\bullet)$ is the curvature and $\varphi(\bullet)$ is a junction potential function, which is a function of the proximity to junction locations defined as $$\phi(x) = \frac{1}{n} \sum_{i=1}^{n} e^{(x-j_i)^2/\sigma}$$

After the graph construction, the minimum cost edge represents a path between two endpoints with minimum bending at the junctions, corresponding to an occluding stroke. In case of a tie, the path with the longest length is chosen. The optimal stroke is removed from the skeleton representation and from the graph. This involves reconnecting the skeleton at X-junctions (to allow the detection of the crossing strokes) and new endpoints have to be added at T-junctions (to allow the detection of occluded strokes). Removing a stroke from the graph involves removing all edges corresponding to paths that go through the removed stroke. This results in breaking the graph into one or more residual sub-graphs, which are processed recursively.

Once the strokes are segmented, the present method includes a process of quantifying the characteristics of individual strokes and representing each individual stroke. The goal is to construct a joint feature space that captures the correlation between the shape of the stroke, its thickness variation, tone variation, and local curvature variation. For this purpose, two different types of features were considered, alone and in combination, namely: 1) hand-crafted features capturing the shape of each stroke and its boundary statistics; and 2) learned-representation features capturing the tone variation as well as local shape characteristics.

In regard to hand-crafted features, each stroke is represented by its skeleton, its boundary, and the rib length around the skeleton. Several descriptors are extracted to quantify the characteristics of each stroke. All the descriptors are designed to be invariant to translation, rotation, scaling, and change in digitization resolution.

One of such descriptors is the shape of the boundary. The shape of the stroke boundary is quantified by Fourier descriptors. Fourier descriptors are widely used shape features for a variety of computer vision applications such as character recognition and shape matching. Fourier descriptors provide shape features that are proven to be invariant to translation, scaling, rotation, sampling, and contour starting points. A total of 40 amplitude coefficients (i.e., the first 20 harmonics in each direction) are used to represent the shape of the boundary of the stroke.

The reconstruction error profile is another of such descriptors. The mean reconstruction error, as a function of the number of harmonics used to approximate the shape of the strokes, is used as a descriptor of the smoothness of the contour and the negative space associated with the stroke. In particular, the mean reconstruction error is computed at each step while incrementally adding more harmonics to approximate the shape of the stroke. The reconstruction error profile is normalized by dividing by the stroke mean-width in pixels to obtain a descriptor invariant to digitization resolution.

Contour curvature is another useful descriptor. To quantify the curvature of the stroke contours, the first and second derivatives of the angular contour representation are used. The distributions of these derivatives are represented by their histograms.

The stroke thickness profile is another descriptor that is helpful. To quantify the thickness of the stroke, the mean and standard deviation of the rib length around the skeleton of the stroke are computed, as well as a histogram of the rib length. All rib length measurements are mapped to mm units to avoid variations in digitization resolution.

The stroke length is also a useful descriptor. The length of the stroke is quantified as the ratio between the stroke skeleton length to the canvas diagonal length, i.e., a comparison of the length of each stroke to the size of the paper or other work surface on which the artist was working. This measure is invariant to digitization resolution.

Other than the traditional feed-forward neural networks specialized at fixed size input, e.g. images, a recurrent neural network (RNN) can handle a variable length sequence input $x=(x_1, \ldots, x_T)$ and either fixed length output or variable length output $y=(y_1, \ldots, y_T)$ by utilizing the hidden state within. The RNN technique sequentially takes input $x_t$ from the input sequence and updates its hidden state by applying the formula:

$$h_t = \phi_\Theta(h_{t-1}, x_t)$$

wherein $\varphi_\odot$ is a nonlinear activation function with $\odot$ as parameters. In each time step, a corresponding output could be generated through:

$$\hat{y}_t = g_\Theta(h_t, x_t)$$

$g_\odot$ is an arbitrary parametric function that is trained together with the recurrent cell.

Recently, it has been widely shown that the more complicated RNN model such as Long Short-Term Memory (LSTM) or Gated Recurrent Unit (GRU) would eliminate the problem of vanishing gradient. LSTM and GRU introduce some gating units that can automatically determine how much the information flow could be used in each time step, by which the vanishing gradient can be avoided.

In GRU, two gate units are introduced: reset gate and update gate. Reset gate controls how much former hidden state would be used in calculating the current time step candidate $\hat{h}_t$.

$$r_t = \sigma(U_r h_{t-1} + W_r x_t)$$

Update gate controls how much current candidate $\hat{h}_t$ would be updated and how much old hidden state would be kept:

$$z_t = \sigma(U_z h_{t-1} + W_z x_t)$$

Then the candidate hidden state $\hat{h}_t$, state would be:

$$\hat{h}_t = \tan h(U(r_t \odot h_{t-1}) + W x_t)$$

And the final hidden state $h_t$ at time t is updated though:

$$h_t = z_t \odot \hat{h}_t + (1-z_t) \lfloor h_{t-1}$$

where U, W, Ur, Wr, Uu, Wu are the learned weight matrices and the biases are omitted here to make the equations more compact. ⊙ is a pointwise multiplication, and σ is a sigmoid function.

Given a stroke, a sequence of patches of fixed size are collected along the skeleton of the stroke and fed to a GRU model as inputs. Fixed size patches, and adaptive size patches where the radius of the patch is a function of the average stroke width in the drawing, were studied. In both cases, the input patches are scaled to 11×11 input matrices. To achieve invariance to the direction of the stroke, each stroke is sampled in both directions as two separate data sequences; at classification, both a stroke and its reverse either appear in training or testing splits. The grey scale image was normalized into a range (−1, 1), and then flattened into an 11×11 image having a 121-dimension vector. The activation function used in experiments is the tan h function. Parameters are initialized from normal distribution with mean=0, standard deviation=1. After comparing several optimizer functions, it was found that the RMSProp optimizer with learning rate 0.001 outperforms others.

The gradient is globally clipped to be less than 5 to prevent the gradient from exploding. To avoid gradient vanishing, the gradient is calculated by the truncated Back Propagation Through Time method. Each sequence is unrolled into a fixed size steps T (T=30 in the experiments) at each time to calculate the gradient and to update the network's parameters. The label of original sequence is assigned to each unrolling. Between each unrolling, the hidden state is passed on to carry former time steps information. Also, within each unrolling, only the last time step hidden state is used in the final linear transformation and Softmax function to get the predicted score of each class. The loss function used was the cross entropy:

$$x_r = (x_t, \ldots x_{t+r})$$

$$h_{t+r} = GRU(h_{initial}, x_r)$$

$$\hat{y} = softmax(U_s h_{t+r})$$

$$loss = -\Sigma y \log(\hat{y})$$

$$h_{initial} = h_{t+r}$$

The label of the original sequence was assigned to every patch of such sequence. A small CNN network (2 convolutional layers, and 1 fully connected layer) is used in classifying each patch. In the first layer, 16 filters with a 3×3 window size is used. The activation function is ReLU and it is followed by a 2×2 max pooling layer. The second convolutional layer has 32 filters also with a size 3×3, followed with a ReLU activation function and another 2×2 max pooling layer. The last feature map is flattened and fed into a fully connected layer, a dropout layer and the final Softmax layer to generate the predicted scores.

For the case of hand-crafted features, strokes are classified using a support vector machine (SVM) classifier. The SVM classifier was evaluated using Radial basis kernels as well as polynomial kernels. The SVM classifier produces posterior distribution over the classes. For the case of learned GRU features, the classification of strokes is directly given by the trained networks. SVM was used to combine hand-crafted features with the learned features in one classification framework. In such case, the activation of the hidden units were used as features, and combined to the hand-crafted features.

A given drawing is classified by aggregating the outcomes of the classification of its strokes. Four different strategies are used for aggregating the stroke classification results, as described below.

Majority Voting: In this strategy, each stroke votes for one class. All strokes have equal votes regardless of the certainty of the output of the stroke classifier.

Posterior aggregate: In this strategy, each stroke votes with a weight equal to its posterior class probability (e.g., the probability of being Picasso vs. non-Picasso, given the stroke). This results in reducing the effect of strokes that are not classified with high certainty by the stroke classifier.

k-certain voting: In this strategy, only the strokes with a class posterior greater than a threshold k are allowed to vote. This eliminates the effect of uncertain strokes.

certainty weighted voting: In this strategy, each stroke vote is weighted using a gamma function based on the certainty of the stroke classifier in classifying it.

Figure 4:
FIG. 4 is an example of a first starting image on the left, and a corresponding second image on the right showing segmentation of strokes in the original.
Figure 5:
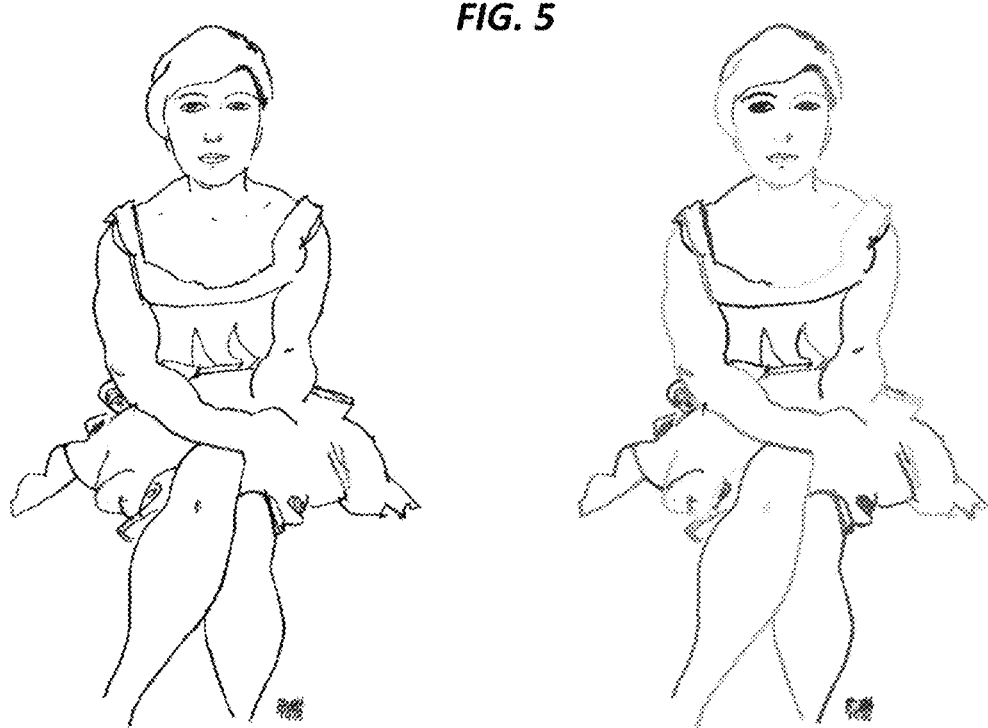
FIG. 5 is another example of a first starting image on the left, and a corresponding second image on the right showing segmentation of strokes in the original.

Experiments were conducted to test and validate the performance of the disclosed methods of stroke segmentation, stroke classification, and drawing classification, on the collected dataset. In particular, the experiments were designed to test the ability of the disclosed methods to determine the attribution of a given art work and test its robustness to detect forged art. As an example, FIG. 4 shows a first starting image on the left, and a corresponding second image on the right showing segmentation of strokes in the original. As another example, FIG. 5 shows a first starting image on the left, and a corresponding second image on the right showing segmentation of strokes in the original.

Validating the segmentation process was quite challenging, since there is no available ground truth segmentation, and because of the difficulty of collecting such annotations. It is quite a tedious process for a human to trace individual strokes to provide segmentation of them, particularly since such task requires a certain level of expertise. To validate the segmentation algorithm, 14 drawings with medium difficulty (in terms of number of strokes) were selected from the collection. The selected drawings, and computer-detected segmentation results, were shown to two human artists who were asked to independently locate errors in the computer-detected segmentations.

Figure 6:
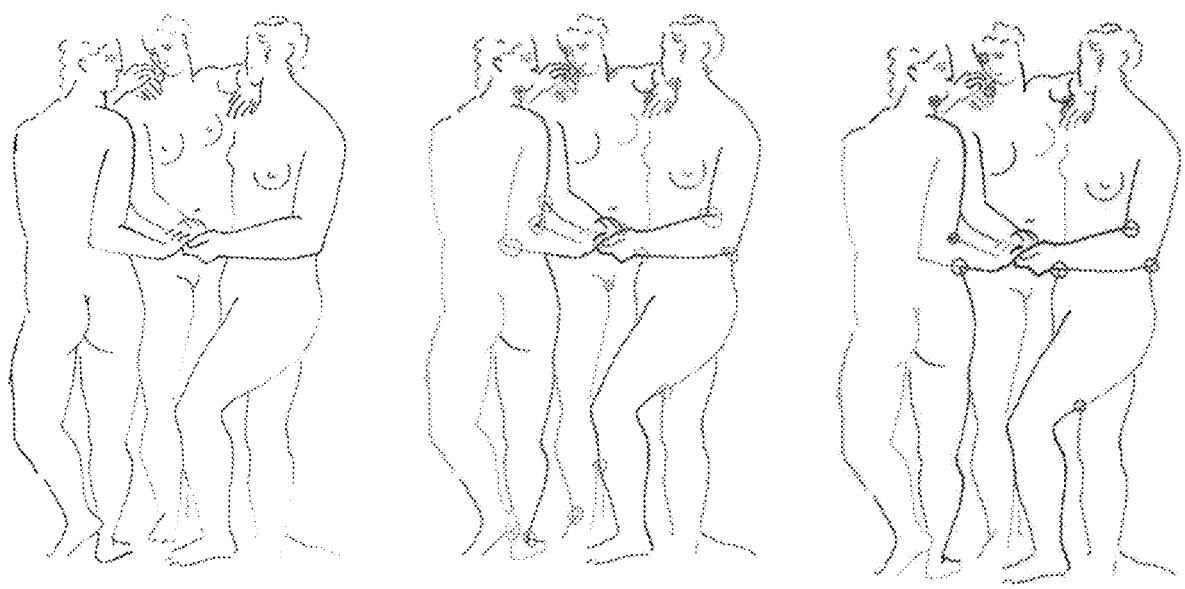
FIG. 6 is an example of a first starting image on the left, and annotated versions in the middle and on the right by two human artists marking segmentation errors.

FIG. 6 shows an example of a drawing with its two annotations of the results. A closer look highlights that the annotators themselves made several mistakes (false positive and false negatives). Table 2 below shows the number of marked errors for each sample image by the two evaluators.

TABLE 2

| Sample | Number of Strokes | Evaluator 1 Marked Errors | Evaluator 2 Marked Errors | Absolute deviation between Evaluators |
|---|---|---|---|---|
| 1 | 596 | 34 | 75 | 41 |
| 2 | 366 | 37 | 17 | 20 |

TABLE 2-continued

| Sample | Number of Strokes | Evaluator 1 Marked Errors | Evaluator 2 Marked Errors | Absolute deviation between Evaluators |
|---|---|---|---|---|
| 3 | 314 | 38 | 11 | 27 |
| 4 | 216 | 24 | 11 | 13 |
| 5 | 267 | 69 | 13 | 56 |
| 6 | 122 | 40 | 14 | 26 |
| 7 | 136 | 28 | 10 | 18 |
| 8 | 131 | 32 | 12 | 20 |
| 9 | 102 | 22 | 10 | 12 |
| 10 | 71 | 17 | 6 | 11 |
| 11 | 159 | 48 | 15 | 33 |
| 12 | 123 | 30 | 8 | 22 |
| 13 | 103 | 25 | 10 | 15 |
| 14 | 196 | 65 | 30 | 35 |
| Total | 2902 | 509 | 242 | |
| Mean | | | | 24.93 |
| Std | | | | 12.72 |

The overall error per annotator is computed as: Error rate=total marked errors at junctions/total number of strokes; where the total is aggregated over all evaluated images. The average error rate over the two annotators is 12.94%, counting all labeled errors by annotators. The annotation shows large deviations between the two annotators, with a mean deviation of 24.93 and a standard deviation of 12%. This highlights the challenge in validating the segmentation results by human annotation. However, most of the marked errors are at small detailed strokes that are hard to segment, even by the human eye, and these errors do not contribute much to the classification of strokes since small strokes are filtered out anyway.

In all experiments, the image datasets were split into five 80/20% folds to perform five-fold cross validation. Since strokes from the same drawings might share similar characteristics, these splits were made at the image level and not at the stroke level. For each fold, after splitting the images to train and test sets, equal numbers of strokes were sampled for each artist class for training and testing to avoid any bias in the data. Different classification settings were evaluated, including pair-wise classification, one-vs-all classification, and multi-class classification. Extensive ablation studies were also performed to evaluate the different features and their effects, as well as to choose the optimal settings.

For testing technique-specific classifiers, pairwise classifiers were trained to discriminate between drawings made by Picasso and Matisse using either pen/ink or etching. These two techniques, and these two artists, were selected since they had the largest representation in the collection under study. Table 3 below shows the stroke classification results. The experiment was performed using five-fold cross validation, and the corresponding mean and standard deviations are reported in Table 3. Table 3 shows a comparison between the different types of proposed features.

TABLE 3

| Approach | Train | Test |
|---|---|---|
| Ink Drawing (Pen/Brush) (Picasso vs Matisse) | | |
| Hand-Crafted—SVM-RBF | 87.99% (0.39%) | 79.16% (0.26%) |
| Hand-Crafted—SVM-POLY | 79.88% (0.14%) | 77.17% (0.58%) |
| GRU | 84.92% (1.89%) | 65.86 (13.58%) |
| Etching Prints (Picasso vs Matisse) | | |
| Hand-Crafted—SVM-RBF | 94.53% (0.22%) | 84.18% (0.85%) |
| Hard-Crafted—SVM-POLY | 94.27% (0.21%) | 93.09% (0.88%) |
| GRU | 83.74% (4.60%) | 75.08% (8.11%) |

Another experiment was conducted using a so-called "one-vs-all" classification setting to build classifiers for Picasso-vs-Non-Picasso, Matisse-vs-Non-Matisse, and Schiele-vs-Non-Schiele. These three artists were chosen since the collection included sufficient data for training and testing the classifiers in a five-fold split setting. The classifiers were then used to evaluate works in the fake dataset.

The performance of two settings was evaluated:

1. across-techniques: the performance of the stroke classifiers on all techniques combined was evaluated to determine whether the classifier can capture an invariant for the artist regardless of the technique used.

2. technique-specific: in this setting, each classifier was trained and tested using strokes from the same drawing technique. Given the contents of the data collection on hand, the tests that were conducted were for: a) Picasso-vs-Non-Picasso classifier using ink/pen; b) Matisse-vs-Non-Matisse classifier using ink/pen; and c) Schiele-vs-Non-Schiele using pencil.

Table 4 below shows the mean and standard deviations of the five folds for the hand-crafted features, the GRU features, and the combination. Both types of features have very good stroke classification performance. GRU has better performance over the three artists tested. Combining the features further improves the results and reduced the cross-fold variances, which indicates that both types of features are complementary to each other as had been hypothesized. Comparing the performance of stroke classifiers on both the technique-specific and across-technique settings, the classifiers performed well in both cases. The GRU performed better in the across-technique setting than in the technique-specific setting, which can be justified by the lack of data in the later case.

TABLE 4

| | | Across-Techniques - Mean (std) of five folds | | | | | |
|---|---|---|---|---|---|---|---|
| | | Hand-crafted + SVM | | GRU | | Combined | |
| Classifier | technique | train | test | train | test | train | test |
| Picasso vs. all | All | 72.59% (1.19%) | 67.26% (8.37%) | 81.92% (2.59%) | 75.09% (5.09%) | 86.05% (1.08%) | 78.54% (4.36%) |
| Matisse vs. all | All | 65.83% (1.72%) | 60.61% (8.71%) | 81.01% (3.41%) | 72.68% (5.58%) | 87.92% (1.73%) | 77.08% (4.33%) |
| Schiele vs. all | All | 84.76% (0.91%) | 81.49% (3.30%) | 85.55% (1.74%) | 78.54% (8.77%) | 91.85% (0.87%) | 86.20% (3.78%) |

TABLE 4-continued

| | | Hand-crafted + SVM | | GRU | | Combined | |
|---|---|---|---|---|---|---|---|
| Classifier | Technique | train | test | train | test | train | test |
| Picasso vs. all | Pen/Ink | 73.20% (2.21%) | 68.93% (7.04%) | 84.08% (2.20%) | 72.24% (1.87%) | 88.40% (1.19%) | 75.92% (4.22%) |
| Matisse vs. all | Pen/Ink | 73.35% (1.99%) | 70.08% (7.94%) | 86.88% (1.98%) | 75.03% (6.47%) | 91.56% (1.03%) | 79.10% (6.55%) |
| Schiele vs. all | Pencil | 82.58% (2.78%) | 75.39% (20.64%) | 94.33% (3.52%) | 69.60% (20.62%) | 91.30% (4.57%) | 72.93% (19.57%) |

For purposes of attribution and/or authentication of a work of art, the one-vs-all setting is the most obvious choice. However, for completeness, a multi-class setting was also tested for completeness. In this experiment, stroke classifiers were trained and tested to discriminate between five classes of works: Picasso, Matisse, Schiele, Modigliani, and Others. The challenge in this setting is that training and test data are bounded by the class that has the least number of samples, because the number of samples by each artist were equalized in training and test sets to avoid data bias. This experiment compared the performance of the hand-crafted features and the GRU features. For the GRU features, the output directly has five nodes to encode the classes. For the hand-crafted features, error-correcting output codes (ECOC) classification setup was used, wherein binary SVM classifiers were trained for each pair of classes.

Table 5 below shows the results of a five-fold cross-validation experiment. There is a significant difference in performance between the two types of features in this experiment, which is far from the differences in all other experiments. It is hypothesized that this is because the ECOC setting limits significantly the number of data samples used for training each binary classifier, while the GRU utilized the samples from all five classes in training.

TABLE 5

| Approach | Train | Test |
|---|---|---|
| Hand-Crafted—SVM | 55.01% (1.41%) | 48.97% (5.82%) |
| GRU | 87.72% (2.43%) | 74.65% (3.41%) |

In particular, the number of training strokes per classes in this experiment were 1418, 1656, 1551, 1162, and 1317 for each of the 5-fold splits respectively, which is a very small number. As a result, the use of a multi-class setting is to be avoided for attribution and authentication due to the hardship in obtaining sizable collections of data set. Instead, for drawing classification and fake detection, it is preferred to use only one-vs-all settings.

The performance of the trained stroke classifiers was tested on drawing classification settings using one-vs-all settings. The four aforementioned strategies were used for aggregating the results from the stroke level to the drawing level. Given that the stroke classifiers are trained on a five-fold cross-validation setting, the drawing classification followed that strategy, i.e. in each fold, each drawing in the test split is classified using the classifier trained on the 80% of the images in the training split, hence there is no standard deviation to report. Table 6 herein shows the results for the across-technique setting and Table 7 herein shows the results for the technique-specific setting.

TABLE 6

| | Picasso-vs-All | | | Matisse-vs-All | | | Schiele-vs-All | | |
|---|---|---|---|---|---|---|---|---|---|
| Aggregation | Hand-crafted | GRU | Combined | Hand-crafted | GRU | Combined | Hand-crafted | GRU | Combined |
| | Across-Techniques | | | | | | | | |
| Majority | 66.67% | 76.77% | 82.49% | 54.88% | 81.14% | 80.47% | 74.41% | 82.49% | 81.82% |
| Posterior | 67.68% | 77.44% | 81.48% | 56.90% | 81.48% | 79.12% | 74.75% | 83.50% | 82.49% |
| 85%-certain | 73.06% | 79.80% | 82.83% | 38.05% | 80.47% | 78.79% | 75.42% | 83.50% | 83.84% |
| Certainty-weighted | 67.34% | 79.80% | 82.83% | 58.25% | 80.81% | 80.47% | 75.42% | 85.19% | 83.16% |
| | Detection of Fake Drawings | | | | | | | | |
| Majority | 100% | 87.50% | 100% | 76.92% | 100% | 100% | 100% | 100% | 100% |
| Posterior | 100% | 87.50% | 100% | 76.92% | 100% | 100% | 100% | 100% | 100% |
| 85%-certain | 100% | 87.50% | 100% | 76.92% | 100% | 100% | 100% | 100% | 100% |
| Certainty-weighted | 100% | 87.50% | 100% | 76.92% | 100% | 100% | 100% | 100% | 100% |

TABLE 7

| | Picasso-vs-All | | | Matisse-vs-All | | | Schiele-vs-All | | |
|---|---|---|---|---|---|---|---|---|---|
| Aggregation | Hand-crafted | GRU | Combined | Hand-crafted | GRU | Combined | Hand-crafted | GRU | Combined |
| | Technique-Specific | | | | | | | | |
| Majority | 72.41% | 82.76% | 81.38% | 65.52% | 78.62% | 82.76% | 81.25% | 78.12% | 81.25% |
| Posterior | 72.41% | 82.76% | 81.38% | 66.21% | 79.31% | 80.69% | 84.38% | 78.12% | 81.25% |
| 85%-certain | 72.41% | 82.76% | 82.76% | 69.66% | 76.55% | 80.69% | 84.38% | 78.12% | 81.25% |
| Certainty-weighted | 71.72% | 82.76% | 82.07% | 69.66% | 77.93% | 80.00% | 87.50% | 78.12% | 81.25% |

TABLE 7-continued

| | Picasso-vs-All | | | Matisse-vs-All | | | Schiele-vs-All | | |
|---|---|---|---|---|---|---|---|---|---|
| Aggregation | Hand-crafted | GRU | Combined | Hand-crafted | GRU | Combined | Hand-crafted | GRU | Combined |
| | | | | Detection of Fake Drawings | | | | | |
| majority | 100.00% | 12.50% | 16.67% | 94.87% | 100.00% | 100.00% | 100.00% | 45.00% | 55.00% |
| Posterior | 100.00% | 12.50% | 16.67% | 97.44% | 100.00% | 100.00% | 100.00% | 45.00% | 55.00% |
| k-certain | 100.00% | 12.50% | 20.83% | 97.44% | 100.00% | 100.00% | 100.00% | 45.00% | 60.00% |
| certainty-weighted | 100.00% | 12.50% | 20.83% | 97.44% | 100.00% | 100.00% | 100.00% | 45.00% | 60.00% |

The trained stroke classifiers were also tested on the collected fake drawings to evaluate whether the classifiers are really capturing artists' stroke characteristics and invariants, or just statistics that can be easily deceived by forged versions. The Picasso-vs-all stroke classifiers were used to test the fake drawings that are made to imitate Picasso drawings (or "Picasso fakes"). A similar setting was used for Matisse fakes and Schiele fakes. Since the stroke classifiers are trained on a five-fold setting, five different classifiers were trained per artist, one for each fold. Each test stroke is classified using the five classifiers and the majority vote is computed. The different aggregation methods are used to achieve a final classification for each drawing. Since one-vs-all setting was adapted, classifying a fake Picasso as "others" in a Picasso-vs-all setting is considered a correct classification, while classifying a fake Picasso as a Picasso is considered a wrong prediction. The bottom parts of Table 6 and Table 7 (see above) show the classification results for the fake dataset for the across-technique and technique-specific settings respectively.

Tables 6 and 7 show that the trained one-vs-all stroke classifiers for all the three artists robustly rejected fake drawing with accuracy reaching 100% in the across-technique case. A notable difference is that the GRU failed to detect the fake drawings, in particular for the Picasso-vs-all, while the hand-crafted features detected all the fakes. A similar case happened for the Schiele-vs-all test as well. It is hypothesized that this is due to the limited training data in the technique-specific case, which did not allow the GRU to learn an invariant model that generalizes as well as in the across-technique case. In contrast the hand-crafted models did not suffer from this limitation. Overall, the hand-crafted features outperformed in detecting the fakes.

Those skilled in the art will appreciate that an automated method for quantifying the characteristics of artist strokes in drawings has been disclosed. In aspects of the present disclosure, machine learning models and techniques are used to analyze works of art. The machine learning models and techniques may be implemented in the cloud and/or on locally-configured computing infrastructure, including various combinations of one or more computing devices such as Nvidia Volta architecture and Nvidia Tesla graphics processing units. Additionally, the models and techniques may be implemented using platforms and engines, such as TensorFlow, MXNet, Caffe2, Keras, PyTorch, and/or ONNX, among others. The approach segments the drawing into individual strokes using novel methods disclosed herein. The characteristics of each stroke are captured using global and local shape features as well as a deep neural network that captures the local shape and tone variations of each stroke. The disclosed method is effective at the stroke classification and drawing classification levels.

Table 8 below shows a comparison between choosing the patch size based on an adaptive radius vs. fixed radius for the GRU model. For the fixed radius case, 11×11 patches are used. For the adaptive case, a radius r is computed for each drawing by computing the mean rip length for each stroke and taking the median over all strokes in the drawing. Square patches of size 2*r+1 are used and scaled to 11×11 patches. The comparison in the table shows that the adaptive radius does not improve over the fixed radius in most of the cases. The comparison is shown for both the across-techniques and technique-specific cases. The adaptive radius showed improvement only in the case of technique-specific Schiele vs. all classification.

TABLE 8

| | one-vs-all drawing classification | | | | | |
|---|---|---|---|---|---|---|
| | Picasso-vs-All | | Matisse-vs-All | | Schiele-vs-All | |
| Aggregation | Adaptive Radius | Fixed Radius | Adaptive Radius | Fixed Radius | Adaptive Radius | Fixed Radius |
| | Across-Techniques | | | | | |
| Majority | 78.11% | 76.77% | 78.79% | 81.14% | 73.40% | 82.49% |
| Posterior | 78.11% | 77.44% | 78.45% | 81.48% | 74.41% | 83.50% |
| 85%-certain | 79.46% | 79.80% | 76.77% | 80.47% | 76.77% | 83.50% |
| Certainty-weighted | 79.46% | 79.80% | 78.45% | 80.81% | 77.78% | 85.19% |
| | Technique-Specific | | | | | |
| Majority | 77.24% | 82.76% | 75.17% | 78.62% | 90.62% | 78.12% |
| Posterior | 77.24% | 82.76% | 74.48% | 79.31% | 90.62% | 78.12% |
| 85%-certain | 77.24% | 82.76% | 76.55% | 76.55% | 90.62% | 78.12% |
| Certainty-weighted | 78.62% | 82.76% | 77.24% | 77.93% | 87.50% | 78.12% |

Another set of experiments was conducted using an ablation study of the elements of the hand-crafted stroke features. Results of such experiments are shown in Table 9 below.

TABLE 9

| Feature | training accuracy | | test accuracy | |
| --- | --- | --- | --- | --- |
| | mean | std | mean | std |
| Fourier Descriptors (FD) | 61.75% | 1.11% | 57.55% | 5.46% |
| Reconstruction Error Profile (REP) | 64.39% | 0.75% | 63.20% | 11.09% |
| Stroke Thickness Profile (STP) | 74.11% | 1.33% | 63.68% | 2.58% |
| Curature | 66.22% | 0.60% | 60.17% | 2.06% |
| Stroke Length (SL) | 57.30% | 0.28% | 57.12% | 1.86% |
| FD + REP | 69.23% | 0.57% | 64.23% | 6.69% |
| STP + Curvature | 79.63% | 0.71% | 68.93% | 4.04% |
| STP + Curvature + SL | 80.60% | 0.80% | 70.17% | 3.81% |
| FD + REP + STP | 77.42% | 1.95% | 68.35% | 4.58% |
| FD + REP + STP + Curvature | 85.91% | 0.88% | 74.13% | 6.47% |
| FD + REP + STP + Curvature + SL | 86.70% | 1.08% | 75.07% | 5.67% |

These experiments were performed using a binary classification setting to discriminate between the strokes of Picasso and Matisse drawn using ink/pen technique. SVM with polynomial kernel of degree 3 was used in all experiments. Five-fold cross validation was performed.

Figure 7:
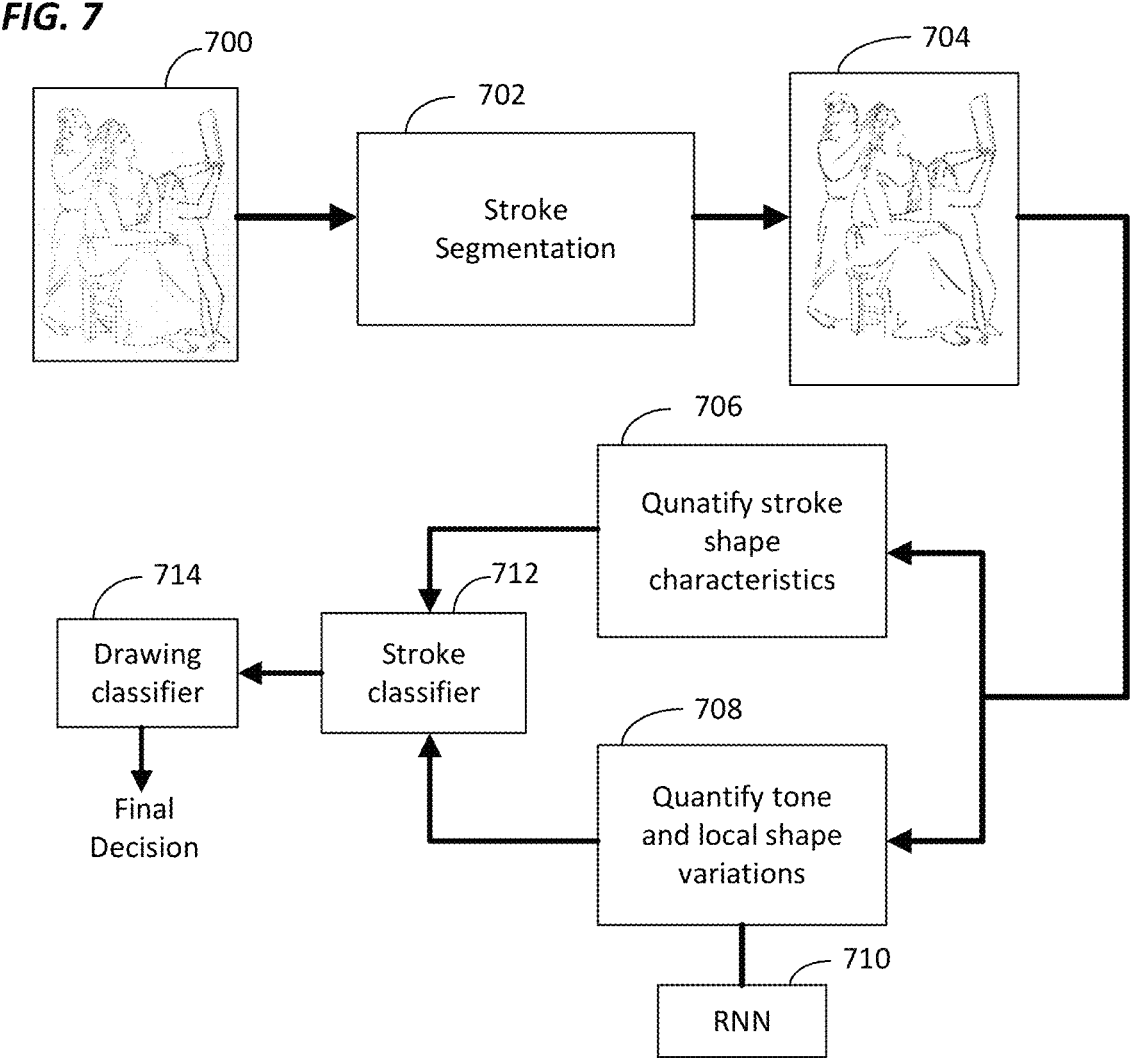
FIG. 7 is a conceptual block diagram showing the steps performed by at least one embodiment of the method disclosed herein.

FIG. 7 is a conceptual block diagram showing the primary steps performed in accordance with at least one embodiment of the present invention. An original drawing 700 is scanned, photographed, or otherwise digitized into a computer graphical format. At step 702, the digitized image is processed by stroke segmentation box 702 to produce a segmented image 704 which includes digital representations of individual strokes. Segmented image 704 is provided to block 706 to quantify the stroke shape and other characteristics. Segmented image 704 is also provided to block 708 to quantify the tone and local shape variations, partly with the help of recurrent neural network 710. The output results generated by blocks 706 and 708 are provided to stroke classifier block 712, and such results are combined to classify each segmented stroke. The results of block 712 are then provided to drawing classifier block 714 to create an overall classification of the drawing. This overall classification can then be compared with one or more computational models to opine whether the work under study can be attributed to one of several known artists, or whether such work is an authentic work or a fake.

Figure 8:
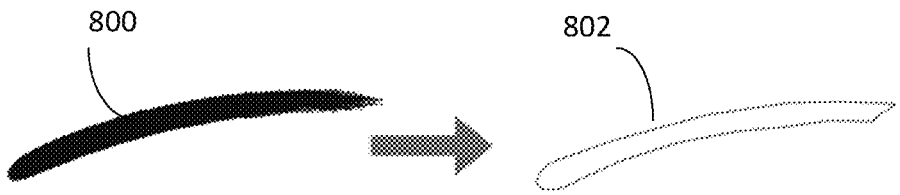
FIG. 8 is a simple drawing of an artist's stroke, and the digital representation of the boundary of such stroke.

FIG. 8 is a drawing illustrating how a simple single stroke 800 may be converted to a shape 802 representing the boundary of the stroke.

Based upon the foregoing, those skilled in the art will appreciate that the methods disclosed herein can be used to discriminate between artists at the stroke-level with high accuracy, even using images of drawings of typical off-the-web, or scanned book, resolutions. The described testing methodology using the collected data set of fake drawings, and the results obtained thereby, show that the disclosed method reliably detects unauthentic imitated drawings. This highlights the ability of the present method to indeed capture artists' invariant characteristics that are hard to imitate.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database.

Computer-implemented steps of the methods noted herein can comprise a set of instructions stored on a computer-readable medium that when executed cause the computing system to perform the steps. A computer-readable medium, as used herein, expressly excludes paper.

A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. Claims directed to methods herein are expressly limited to computer implemented embodiments thereof and expressly do not cover embodiments that can be performed purely mentally.

Several embodiments are specifically illustrated and/or described herein. However, it will be appreciated that modifications and variations are covered by the above teachings and within the scope of the appended claims without departing from the spirit and intended scope thereof. It should be understood that the description, and specific embodiments, discussed herein are merely illustrative of the present invention. Various modifications or adaptations of the methods described may become apparent to those skilled in the art and/or devised by those skilled in the art without departing from the disclosure. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. The present disclosure is intended to embrace all such alternatives, modifications and variances. The embodiments described are presented only to demonstrate certain examples of the disclosure. Other elements, steps, methods, and techniques that are insubstantially different from those described above and/or in the appended claims are also intended to be within the scope of the disclosure.

The use of the term "means" within a claim of this application is intended to invoke 112(f) only as to the limitation to which the term attaches and not to the whole claim, while the absence of the term "means" from any claim should be understood as excluding that claim from being interpreted under 112(f). As used in the claims of this application, "configured to" and "configured for" are not intended to invoke Section 112(f) of the Patent Laws.

What is claimed:

1. A computer-implemented method of assessing a work of art that includes a plurality of strokes and to attribute such work of art to one of a plurality of potential known artists, the method including the steps of:

providing to a computer a plurality of digital images of works of art for which the identity of the artist is known, the plurality of digital images including works of art created by a plurality of known artists, each of such known works of art including a plurality of strokes;

using a computer to identify strokes within such known works of art;

creating a stroke skeleton representation for each such identified stroke associated with such known works of art, the stroke skeleton representation corresponding to the topological structure of each such identified stroke;

using a computer to determine stroke characteristics for each identified stroke associated with such known works of art;

using a computer to establish from such stroke characteristics one or more stroke signatures associated with the artist of each such known work of art;

storing the stroke signatures in a memory associated with a computer;

providing to a computer a digitized image of a work of art to be analyzed, the work of art to be analyzed including a plurality of strokes;

using a computer to identify strokes within the work of art to be analyzed;

creating a stroke skeleton representation for each such identified stroke within the work of art to be analyzed, the stroke skeleton representation corresponding to the topological structure of each such identified stroke;

using a computer to determine stroke characteristics for each identified stroke within the work of art to be analyzed;

using a computer to compare stroke characteristics within the work of art to be analyzed with stored stroke signatures associated with the plurality of artists of such known works of art; and using the computer to determine, based upon such comparison, a likelihood that each identified stroke being analyzed was created by one of the plurality of known artists, and aggregating the likelihood for each identified stroke to determine a statistical likelihood that the work of art to be analyzed is a work of art that was created by one of the plurality of known artists of one or more of such known works of art and thereby identify the artist who created such work of art;

wherein the steps of using a computer to determine stroke characteristics for each identified stroke in a work of art includes the steps of:

a) selecting a plurality of two-dimensional image patches within the work of art, each of such selected image patches overlying a portion of the stroke skeleton representation for the identified stroke;

b) providing the plurality of image patches as inputs to a neural network computational model to characterize the identified stroke according to at least one stroke characteristic.

2. The method of claim 1 wherein:

a) wherein the step of using a computer to determine stroke characteristics for each identified stroke associated with such known works of art includes quantifying a stroke thickness profile for each identified individual stroke;

b) wherein the step of using a computer to determine stroke characteristics for each identified stroke within the work of art to be analyzed includes quantifying a stroke thickness profile for each identified individual stroke; and c) wherein the step of using a computer to compare stroke characteristics within the work of art to be analyzed with stored stroke signatures associated with the plurality of artists of such known works of art includes the step of comparing stroke thickness profiles within the work of art to be analyzed with stroke thickness profiles associated with such known works of art.

3. The method of claim 1 wherein:

a) wherein the step of using a computer to determine stroke characteristics for each identified stroke associated with such known works of art includes quantifying tonal variations for each identified individual stroke along its length;

b) wherein the step of using a computer to determine stroke characteristics for each identified stroke within the work of art to be analyzed includes quantifying tonal variations for each identified individual stroke along its length; and c) wherein the step of using a computer to compare stroke characteristics within the work of art to be analyzed with stored stroke signatures associated with the plurality of artists of such known works of art includes the step of comparing tonal variations within for each identified individual stroke along its length within the the work of art to be analyzed with tonal variations for each identified individual stroke along its length associated with such known works of art.

4. The method of claim 1 wherein the step of selecting the plurality of two-dimensional image patches within the work of art includes the step of sizing each of the plurality of image patches whereby each such image patch contains only a portion of an identified stroke.

\* \* \* \* \*